(12) United States Patent
Ihm et al.

(10) Patent No.: US 7,907,950 B2
(45) Date of Patent: Mar. 15, 2011

(54) METHOD FOR ESTABLISHING FAST FEEDBACK CHANNEL AND TRANSMITTING INFORMATION IN A WIRELESS COMMUNICATION SYSTEM

(75) Inventors: Bin Chul Ihm, Gyeonggi-do (KR); Jin Young Chun, Seoul (KR); Yong Suk Jin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 663 days.

(21) Appl. No.: 11/573,686

(22) PCT Filed: Aug. 17, 2005

(86) PCT No.: PCT/KR2005/002703
§ 371 (c)(1),
(2), (4) Date: Dec. 10, 2007

(87) PCT Pub. No.: WO2006/019263
PCT Pub. Date: Feb. 23, 2006

(65) Prior Publication Data
US 2008/0119213 A1    May 22, 2008

(30) Foreign Application Priority Data

Aug. 17, 2004 (KR) .................. 10-2004-0064542
Aug. 17, 2004 (KR) .................. 10-2004-0064553

(51) Int. Cl.
*H04W 72/00* (2009.01)
(52) U.S. Cl. .............. 455/450; 455/451; 455/452.1; 455/464
(58) Field of Classification Search .......... 455/450–455, 455/464, 509, 516, 517, 61, 68, 69, 422.1, 455/456.2, 510; 370/236.1, 395.41, 332; 375/E7.141
See application file for complete search history.

(56) References Cited

U.S. PATENT DOCUMENTS

| 6,831,943 | B1* | 12/2004 | Dabak et al. | 375/147 |
| 6,850,504 | B1* | 2/2005 | Cao et al. | 370/335 |
| 7,039,370 | B2* | 5/2006 | Laroia et al. | 455/101 |
| 7,158,474 | B1* | 1/2007 | Gerakoulis | 370/206 |
| 7,180,956 | B1* | 2/2007 | Banister | 375/267 |
| 7,492,749 | B2* | 2/2009 | Song et al. | 370/342 |
| 7,492,788 | B2* | 2/2009 | Zhang et al. | 370/468 |
| 2003/0103445 | A1* | 6/2003 | Steer et al. | 370/208 |

(Continued)

FOREIGN PATENT DOCUMENTS

CN    1297295    5/2001

(Continued)

OTHER PUBLICATIONS

Almgren, M. et al: Radio Resource Allocation in AMPS/TACS Systems Based on Uplink Observations; IEEE 45th Vehicular Technology Conference, Jul. 1995.

*Primary Examiner* — Dominic E Rego
(74) *Attorney, Agent, or Firm* — Lee, Hong, Degerman, Kang & Waimey (57) ABSTRACT

A method of transmitting information in a wireless communication system is disclosed. More specifically, the method includes a base station (BS) which receives data from a mobile subscriber station (MSS) via an uplink channel. Using the antennas) received data, the BS determines quality of the uplink channel. Thereafter, the BS transmits feedback information to the MSS. Here, the feedback information is based on the determined quality of the uplink channel.

21 Claims, 10 Drawing Sheets

U.S. PATENT DOCUMENTS

| | | | |
|---|---|---|---|
| 2004/0066766 A1* | 4/2004 | Shiu et al. | 370/335 |
| 2004/0127223 A1* | 7/2004 | Li et al. | 455/446 |
| 2004/0141466 A1* | 7/2004 | Kim et al. | 370/252 |
| 2004/0192218 A1* | 9/2004 | Oprea | 455/73 |
| 2005/0141624 A1* | 6/2005 | Lakshmipathi et al. | 375/260 |
| 2006/0116078 A1* | 6/2006 | Miyoshi | 455/45 |
| 2006/0153061 A1* | 7/2006 | Nishio | 370/208 |
| 2007/0263655 A1* | 11/2007 | Esteves et al. | 370/460 |
| 2009/0161783 A1* | 6/2009 | Ozluturk | 375/260 |

FOREIGN PATENT DOCUMENTS

| | | |
|---|---|---|
| EP | 1317080 | 6/2003 |
| EP | 1317080 A1 | 6/2003 |
| EP | 1467503 A1 | 10/2004 |
| WO | WO 2004/042970 | 5/2004 |
| WO | WO2004/042970 | 5/2004 |

* cited by examiner

| Syntax | Size | Notes |
|---|---|---|
| DL fast feedback channel IE(){ | | |
| Extended DIUE | 4bits | |
| Length | variable | |
| OFDMA symbol offset | 8bits | |
| Subchannel offset | 6bits | |
| Boosting | 3bits | |
| No. OFDMA Symbols | 7bits | |
| No. subchannels | 6bits | |
| Repetition coding Indication | 2bits | 0b00=No repetition coding<br>0b01=Repetition coding of 2 used<br>0b10=Repetition coding of 4 used<br>0b11=Repetition coding of 6 used |
| CID | 16bits | |
| } | | |

FIG. 5

| DIUC | Usage) |
|---|---|
| 0~12 | Different burst profile |
| 13 | Gap/PARP reduction |
| 14 | DL fast feedback channel |
| 15 | Extended DIUC |

FIG. 6

| Syntax | Size | Notes |
|---|---|---|
| CQICH DL allocation IE(){ | | |
| Extended DIUC | 4bits | |
| Length | variable | |
| Feedback type | 2bits | 00=complex weigh<br>01=channel quality<br>10~11=reserved |
| Matrix size | 4bits | LSB 2bits repesents rows, MSB 2bits represents columns |
| For(I=0;i<N_element;I++)} | | Number of rows x number of columns |
| Allocation index | 6bits | Index of DL fast feedback channel region indicated due to DL feedback channel IE(DIUE=14) |
| ~ | | |
| ~ | | |

METHOD FOR ESTABLISHING FAST FEEDBACK CHANNEL AND TRANSMITTING INFORMATION IN A WIRELESS COMMUNICATION SYSTEM

TECHNICAL FIELD

The present invention relates to a method of establishing feedback channel and transmitting information, and more particularly, to a method of establishing fast feedback channel and transmitting information in a wireless communication system having multiple antennas.

BACKGROUND ART

In an Orthogonal Frequency Division Multiplexing/Orthogonal Frequency Division Multiplexing Access (OFDM/OFDMA) system, a base station (BS), which supports a plurality of antennas, can attain transmission diversity gain by receiving feedback information from a mobile subscriber station (MSS). The feedback information includes weight value(s) or channel information. Here, the feedback information is transmitted from the MSS to the BS via an uplink transmission high speed (or fast) feedback channel.

In detail, the feedback information relates to various determined (or measured) information of the BS transmission signals. The feedback information provides necessary information for the BS to transmit more accurate transmission signals. Here, the determined information can include various determined value(s) of downlink transmission signals. For example, the determined value of the downlink signal can be a signal/noise (S/N) value or a weight or selected mode value (space-time transmit diversity or spatial multiplexing) in case of multi-input multi-output (MIMO).

Figure 1:
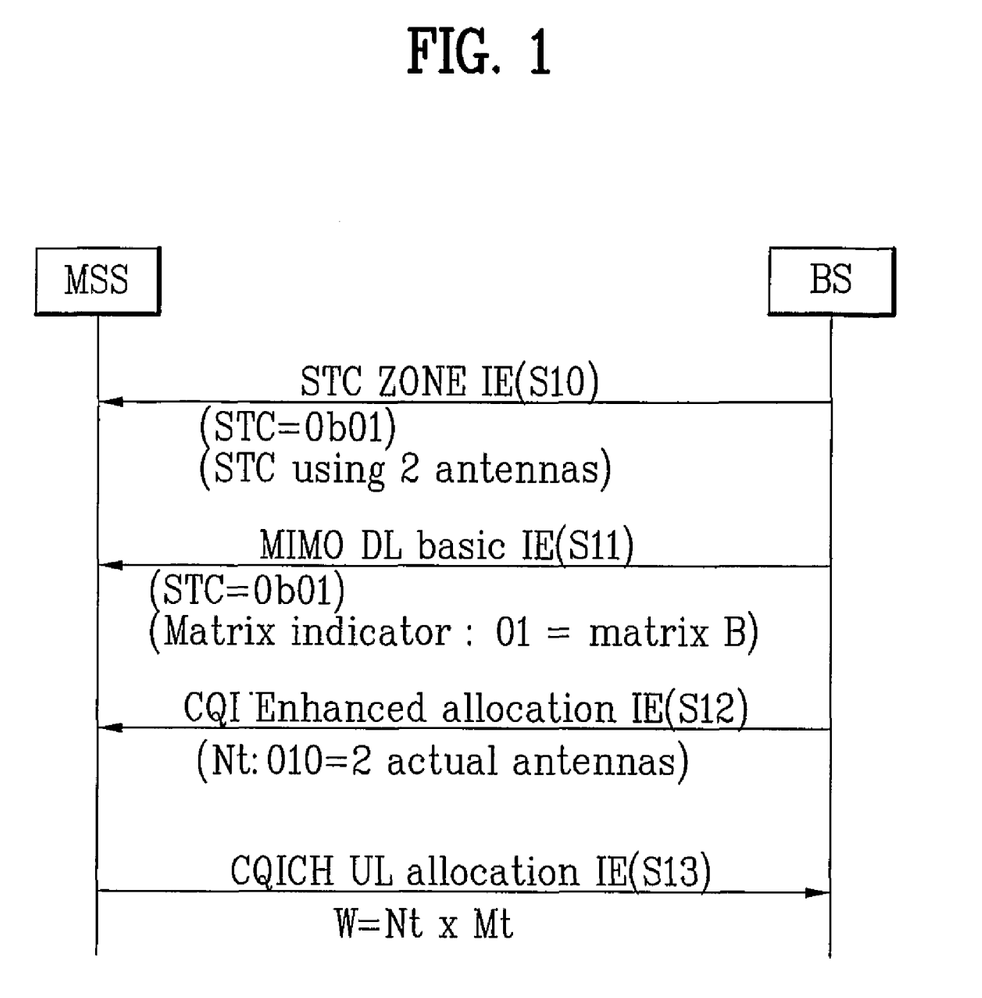
FIG. 1 illustrates an example of a mobile subscriber station sending to a base station feedback information, which includes weight values (or channel information), acquired in a downlink transmission.

FIG. 1 illustrates an example of a MSS sending to a BS feedback information, which includes weight values (or channel information), acquired in a downlink transmission. As illustrated in FIG. 1, the BS, which uses a plurality of antennas, informs the MSS of a space-time coding (STC) mode via a STC zone IE message. The STC mode is determined based on a number of antennas possessed by the BS. At the same time, the BS notifies the MSS which matrix type (e.g., type B) the BS plans to use. The multi-input multi-output (MIMO) downlink (DL) basic IE message is the avenue through which the BS notifies the MSS of which matrix type it plans to use. Furthermore, the BS notifies to the MSS via a Channel Quality Indicator Channel (CQICH) Enhanced Allocation IE message the mapping scheme of the weight value to be assigned to the uplink high speed feedback channel.

On the other hand, the MSS determines the downlink channel quality or acquires a weight matrix W based on the downlink channel quality determination. The size of the weight matrix is determined by the number of BS transmission antennas and the number of output signals according to the STC scheme. The following Equation 1 is an example of the weight matrix W in connection with four BS transmission antennas and two STC outputs.

$$W = \begin{bmatrix} w_{11} & w_{12} \\ w_{21} & w_{22} \\ w_{31} & w_{32} \\ w_{41} & w_{42} \end{bmatrix} \quad [\text{Equation 1}]$$

The MSS sends feedback of the weight matrix W and the channel quality information acquired through Equation 1 via the CQICH (S12). In order to improve the signal-to-noise ratio (SNR) in the receiving end by the BS, which uses a plurality of transmission antennas, the BS receives a downlink determined value or a weight value. At the same time, the BS allocates the uplink CQICH to the MSS in order to receive the downlink determined value or weight value.

Additionally, in the existing 802.16 OFDMA system, a message of the fast feedback channel of the uplink is allocated to an uplink slot. Here, an uplink slot indicates one sub-channel zone, which encompasses three symbols, and is comprised of six tiles. A slot of IEEE 802.16 OFDMA system refers to the smallest unit available for data allocation and can be expressed in time domain and sub-channel domain. Moreover, a tile comprises eight data sub-carriers.

Table 1 provided below shows a method by which sub-carriers of a fast feedback channel are modulated. Moreover, Table 2 shows sub-carrier modulation method as applied to each vector of Table 1.

TABLE 1

| 4 bit payload | Vector indices to be used by fast feedback channel per tile (tile 0, tile 1 ... tile 5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, 0, 1, 2, 3, 4 |

TABLE 2

| Vector Index | Data sub-carrier modulation method per each vector index (sub-carrier 0, sub-carrier 1 ... sub-carrier 7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

As shown in Table 1 and Table 2, the feedback information is expressed as payload in four (4) bits, and based the payload value, vector indices of six (6) tiles to be used in the fast feedback channel can be attained. Furthermore, eight (8) sub-carriers are provided with different modulation values based on each vector index.

The following are equations regarding each modulation scheme (P0, P1, P2, P3) with respect to Table 2.

$$P0 = \frac{1}{\sqrt{2}} \cdot \exp\left(j \cdot \frac{\pi}{4}\right)$$

$$P1 = \frac{1}{\sqrt{2}} \cdot \exp\left(j \cdot \frac{3\pi}{4}\right)$$

$$P2 = \frac{1}{\sqrt{2}} \cdot \exp\left(-j \cdot \frac{3\pi}{4}\right)$$

$$P3 = \frac{1}{\sqrt{2}} \cdot \exp\left(-j \cdot \frac{\pi}{4}\right)$$

The MSS using a plurality of antennas has to receive feedback information from the BS in order to achieve transmission diversity. The feedback information includes the uplink determined value (channel information or weight value). However, there is not a defined channel which allows for fast feedback of the BS determined value to the MSS.

DISCLOSURE OF INVENTION

Accordingly, the present invention is directed to a [title] that substantially obviates one or more problems due to limitations and disadvantages of the related art.

An object of the present invention is to provide a method of transmitting information in a wireless communication system.

Another object of the present invention is to provide a method of receiving information in a wireless communication system.

A further object of the present invention is to provide a wireless communication system for transmitting information.

Another object of the present invention is to provide a method of establishing a fast feedback channel and transmitting information thereto.

Another object of the present invention is to provide a method of receiving transmitted information through an established fast feedback channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting information in a wireless communication system which includes a base station (BS) which receives data from a mobile subscriber station (MSS) via an uplink channel. Using the received data, the BS determines quality of the uplink channel. Thereafter, the BS transmits feedback information to the MSS. Here, the feedback information is based on the determined quality of the uplink channel.

In another aspect of the present invention, a method of transmitting information in a wireless communication system which includes a base station (BS) which allocates a physical resource for a downlink fast feedback channel. Here, the physical resource for the downlink fast feedback channel is different from a physical resource for a data channel. Furthermore, the BS establishes a modulation pattern, which corresponds to feedback information, to the downlink fast feedback channel by the BS. In addition, the BS transmits the modulation pattern, which corresponds to feedback information, to a mobile subscriber station (MSS) so that the MSS can determine which feedback information is transmitted from the BS via the modulation pattern.

In another aspect of the present invention, a method of receiving information in a wireless communication system which includes a mobile subscriber station (MSS) which transmits data to a base station (BS) via an uplink channel. Thereafter, the MSS receives feedback information from the MSS. Here, the feedback information is based on quality of the uplink channel, and the quality of the uplink channel is determined based on the transmitted data. In another aspect of the present invention, a method of receiving information in a wireless communication system which includes a mobile subscriber station (MSS) which receives and detects a modulation pattern transmitted from a base station (BS). Here, the modulation pattern is established to a downlink fast feedback channel, and importantly, the modulation pattern corresponds to feedback information. Furthermore, the MSS determines which feedback information is transmitted from the BS via the modulation pattern. After determining which feedback information is transmitted from the BS, the MSS transmits uplink data which is configured by using the feedback information.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. The embodiments of the present invention can apply to an Orthogonal Frequency Division Multiplexing/Orthogonal Frequency Division Multiplexing Access (OFDM/OFDMA) system and also can be applied to other standards wireless communication system. Examples related to the embodiments of the present invention are provided below.

In an embodiment of the present invention, a base station (BS) sends feedback information to a mobile subscriber station (MSS) via a fast (or high speed) downlink feedback channel. The feedback information includes a channel quality information (CQI) and weight value(s) received through uplink channel(s). In operation, the BS informs the MSS of the fast downlink feedback channel through which data is transmitted. Thereafter, the BS establishes the CQI or weight value to the fast downlink feedback channel and transmits the information to the MSS.

Preferably, the notification of the fast downlink feedback channel to the MSS is carried out via a DIUC message or a downlink (DL) fast feedback channel IE message. Here, the CQI or the weight values are transmitted via the CQI Channel (CQICH) DL location IE message.

Figure 2:
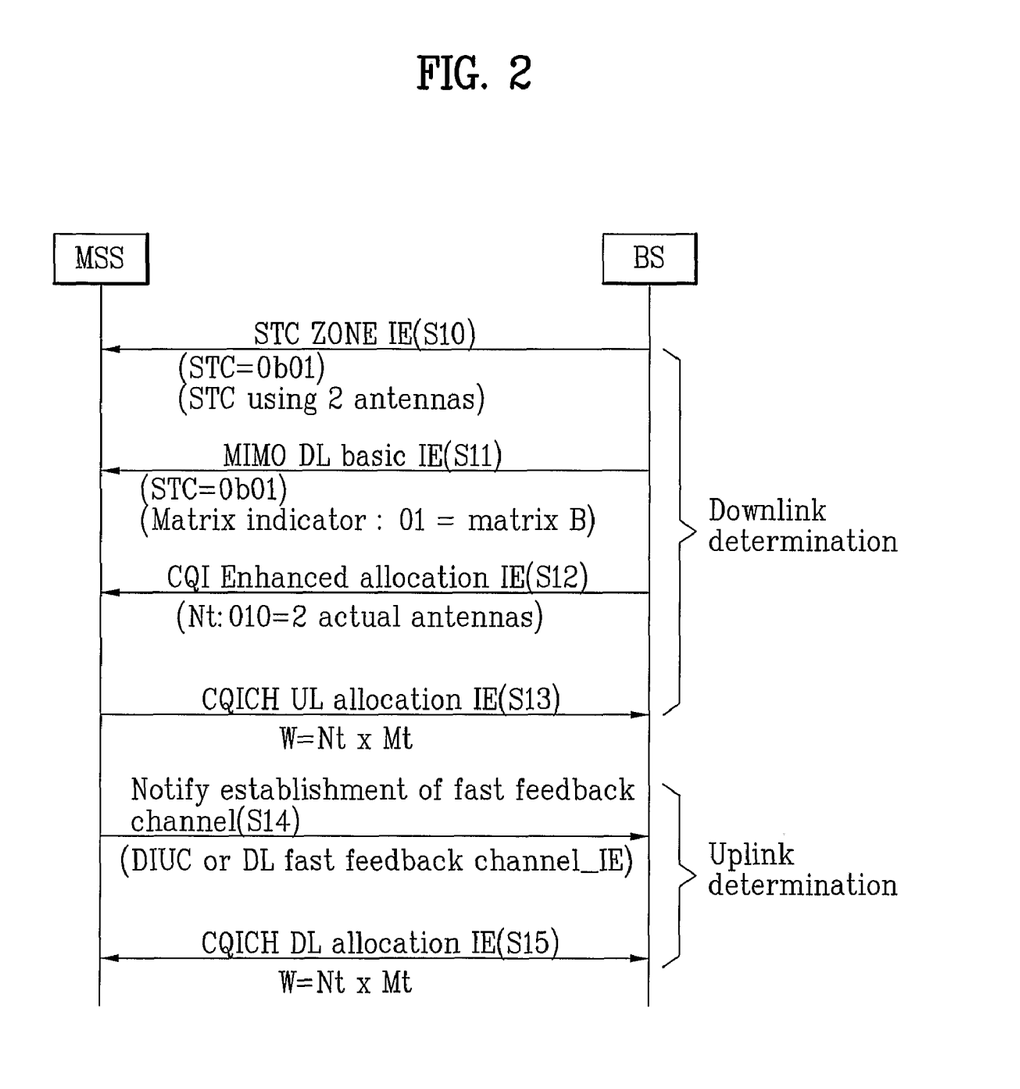
FIG. 2 illustrates an example of the BS sending feedback information, which includes the result of uplink channel quality assessment, to the MSS in the OFDM/OFDMA system according to an embodiment of the present invention.

FIG. 2 illustrates an example of the BS sending feedback information, which includes the result of uplink channel quality assessment, to the MSS in the OFDM/OFDMA system according to the embodiment of the present invention. In FIG. 2, as explained above, the BS assigns the STC mode to the MSS based the number of BS transmission antennas via the STC zone IE message. At the same time, the MSS acquires weight matrix ($W=N_r \times M_t$). The weight matrix is derived based on the number of BS transmission antennas and the number of output signals from the STC scheme. Moreover, the BS allocates the uplink high speed feedback channel, also referred to as the CQICH, to the MSS.

Subsequently, the MSS notifies of the weight matrix ($W=N_r \times M_t$) to the BS via the allocated CQICH, and the BS, as a result is able to attain transmission diversity gain by receiving from the MSS the weight value for each channel. However, in order for the MSS, which uses multiple antennas, to achieve transmission diversity gain, the MSS has to receive feedback information on uplink channel quality value (channel information or weight value) from the BS. In other words, after the steps (S10-S13) are performed and the BS receives the downlink channel quality assessed value (channel information or weight value) from the MSS, the BS transmits feedback information concerning the uplink channel quality assessed value (channel information or weight value) to the MSS.

Figure 3:
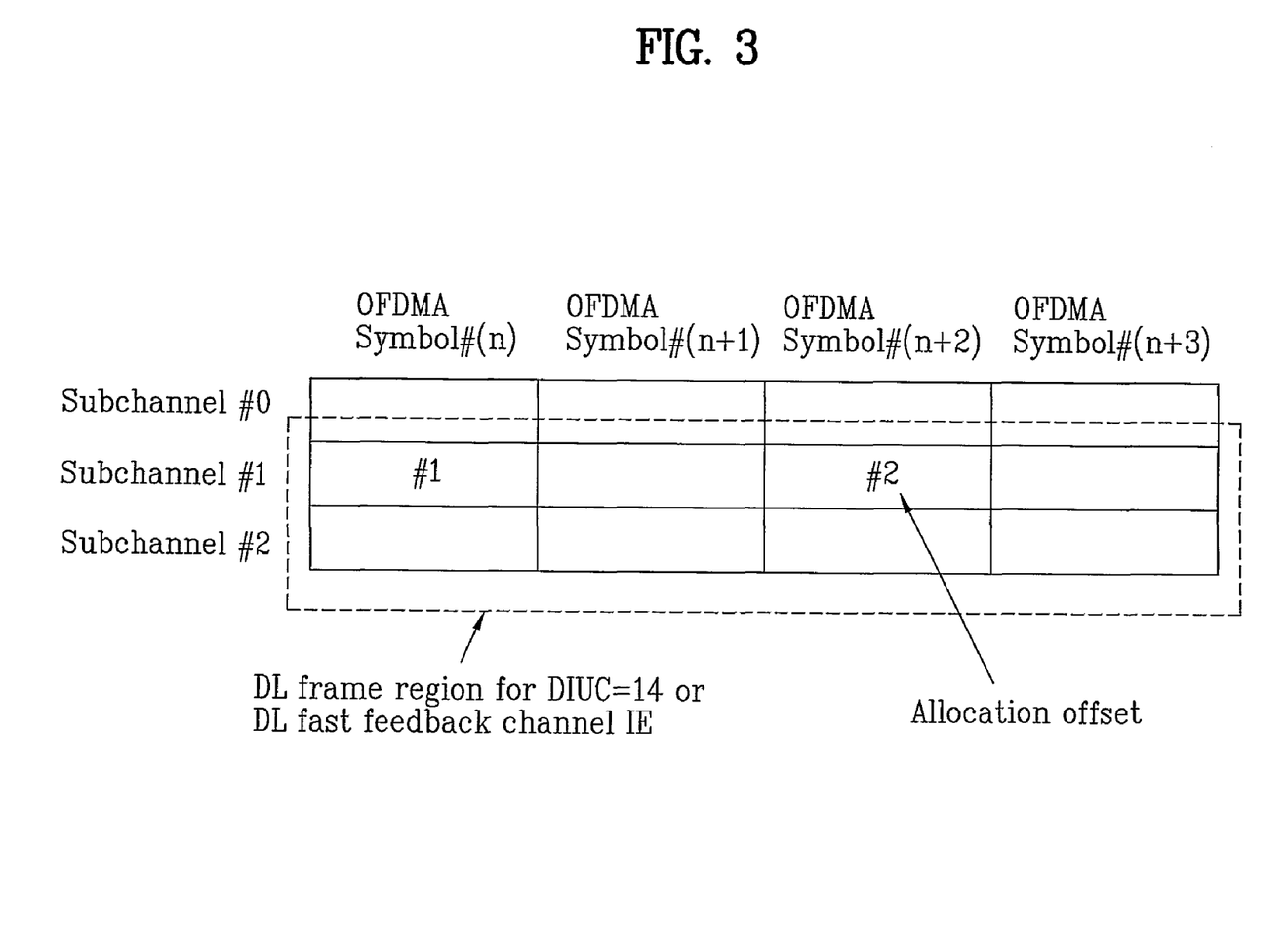
FIG. 3 illustrates an example of setting a determined uplink value to a specified physical resource of a fast feedback channel.

Furthermore, the BS uses the DIUC or the DL fast feedback channel IE message to notify the MSS of the high speed downlink feedback channel (S14). As illustrated in FIG. 3, the BS transmits the uplink channel quality assessed value (channel information or weight value) to the MSS on an assigned specific location (or space) of the high speed downlink feedback channel (S15).

Figure 4:
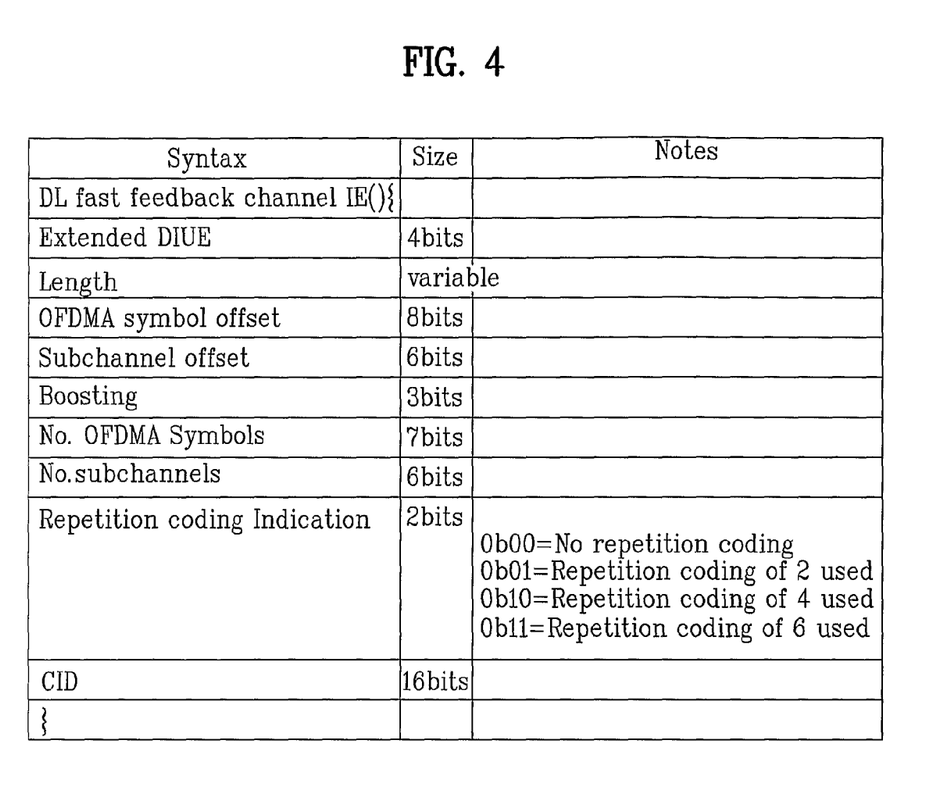
FIG. 4 illustrates an example of a format of an IE message of a downlink high speed feedback channel using an extended DIUC.
Figure 5:
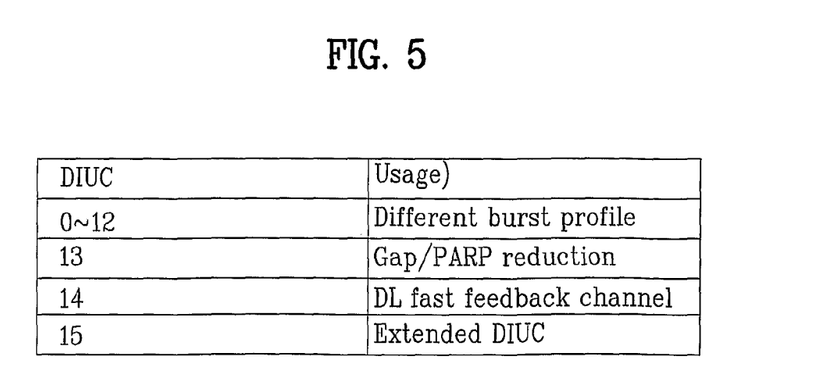
FIG. 5 illustrates an example of a format of an IE message of a downlink high speed feedback channel using an OFDMA DIUC value.

FIG. 4 and FIG. 5 illustrate examples of a format of an IE message for the BS notifying the MSS of the high speed downlink feedback channel. Here, FIG. 4 is an example using an extended DIUC, and FIG. 5 is an example using OFDMA DIUC value.

Figure 6:
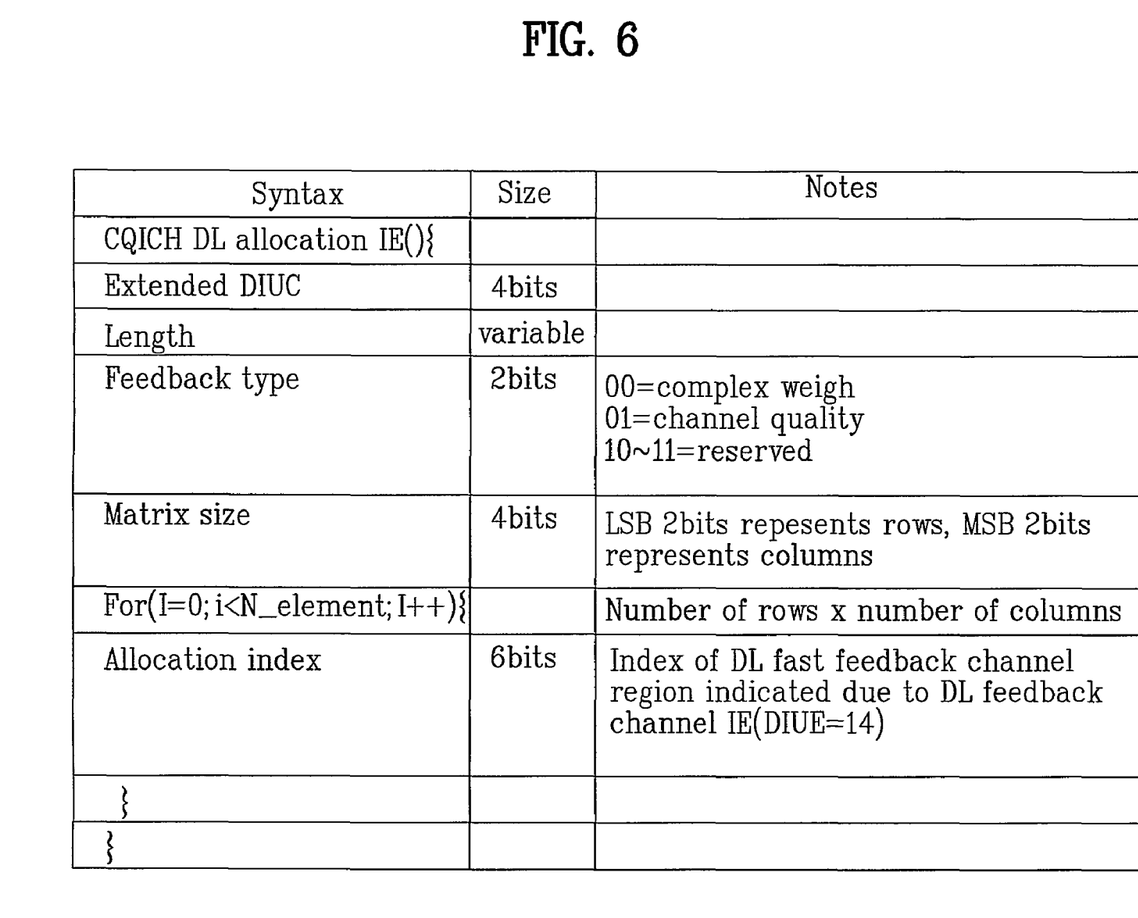
FIG. 6 is an example of a format illustrating the CQICH DL location IE message which includes the weight value and channel information of the BS.

Furthermore, FIG. 6 is an example of a format illustrating the CQICH DL location IE message which includes the weight value and channel information of the BS. Here, each CQICH location IE occupies one downlink (DL) slot, and as illustrated in FIG. 3, the DIUC=14 or the DL fast feedback channel IE is assigned to the high speed downlink feedback channel.

Figure 7:
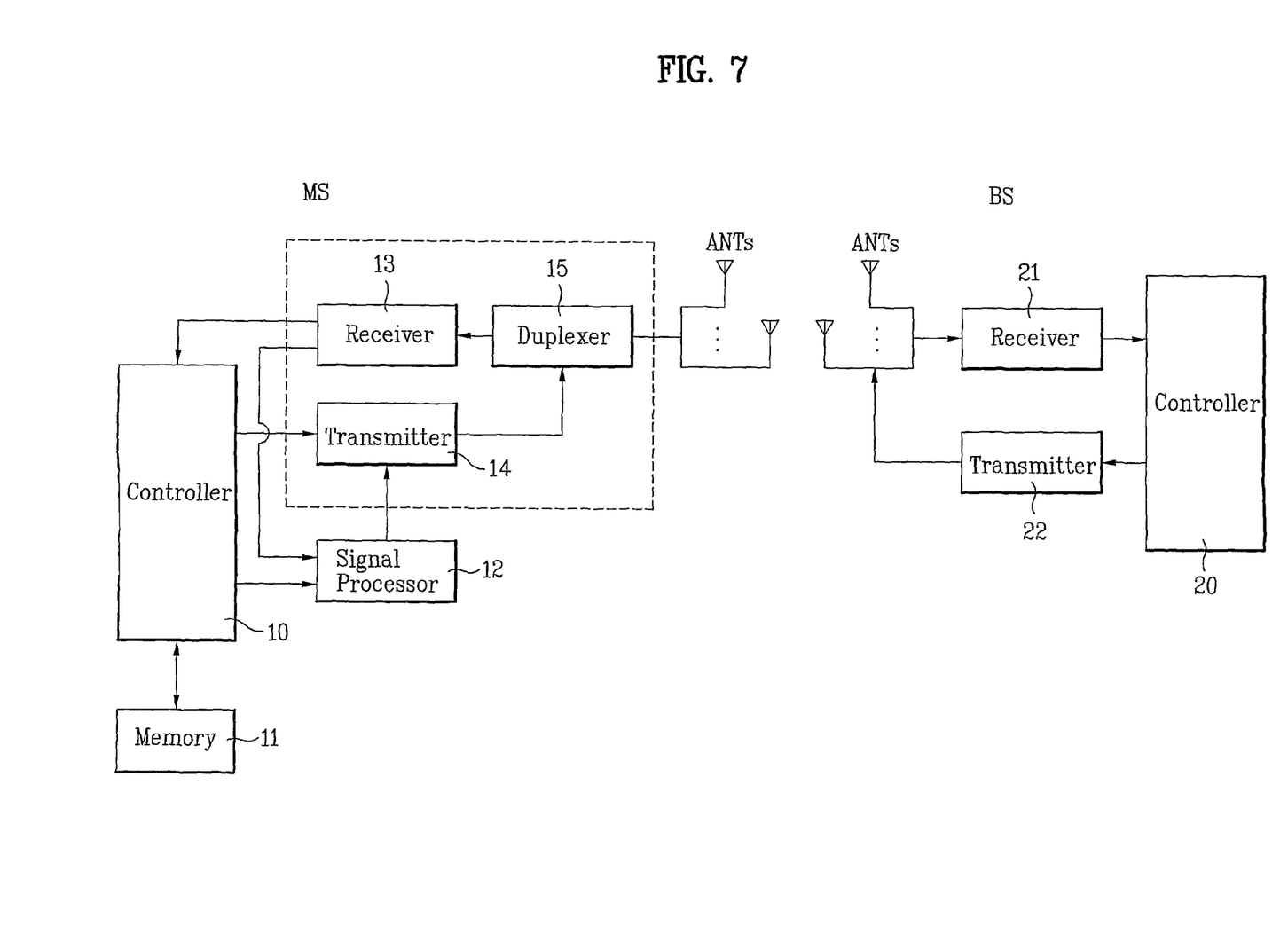
FIG. 7 is an example of a structure of a wireless communication system illustrating an operation of transmitting/receiving information between the BS and the MSS.

FIG. 7 is an example of a structure of a wireless communication system illustrating an operation of transmitting/receiving information between the BS and the MSS. More specifically, the BS receives via the receiver 21 data from the MSS via an uplink channel to determine the quality of the uplink channel by the controller 20. The BS can receive data as well as other types of data and information through which channel status and/or quality can be determined, for example. The BS can then use the transmitter 22 to transmit feedback information to the MSS. Here, the feedback information is based on the determined quality of the uplink channel.

In order for communication to take place, the MSS transmits data first to the BS via the transmitter 14. After the controller 20 of the BS determines the quality of the uplink channel and transmits via the transmitter 22, the receiver 13 of the MSS receives the feedback information from the BS.

Another embodiment of the present invention relates to allocating a physical channel space to provide fast feedback channel in a downlink direction and defining a sub-carrier modulation method for the feedback channel so that the BS can send feedback information, including channel quality information and weight value(s), received in the uplink transmission, to the MSS via a defined feedback channel.

Figure 8:
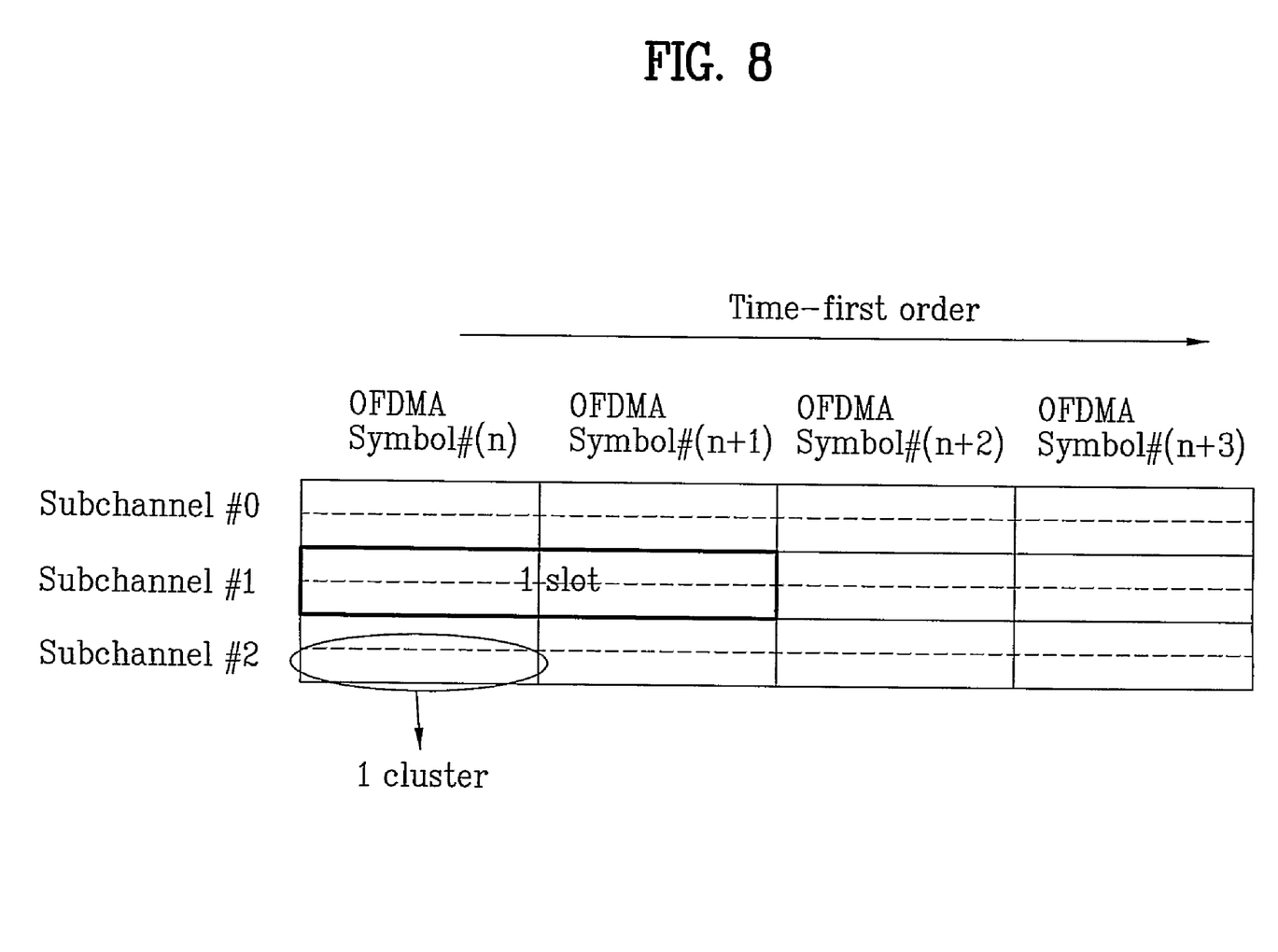
FIG. 8 illustrates an example of a basic allocation unit of a fast feedback channel in a downlink Partial Usage of Sub-Channels (PUSC) mode.
Figure 9:
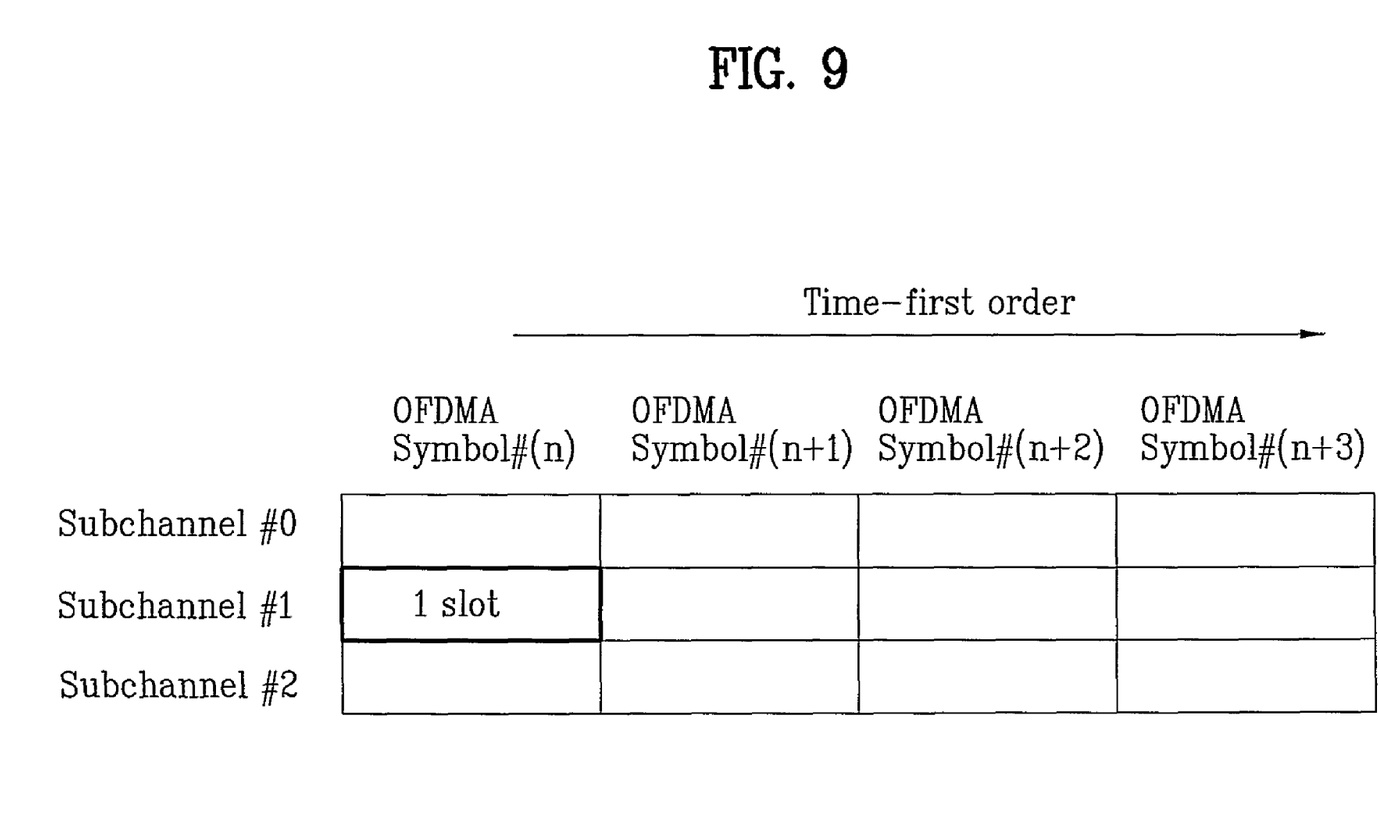
FIG. 9 illustrates an example of a basic allocation unit of a fast feedback channel in a downlink Full Usage of Sub-Channels (FUSC) mode.

FIG. 8 is an example illustrating a basic allocation unit of a fast feedback channel in a downlink Partial Usage of Sub-Channels (PUSC) mode. FIG. 9 is an example illustrating a basic allocation unit of a fast feedback channel in a downlink Full Usage of Sub-Channels (FUSC) mode. In IEEE 802.26 OFDMA system, the downlink frame fundamentally provides the PUSC and FUSC modes. The PUSC mode provides a permutation scheme whereby only partial sub-channels are used in transmitting data. As illustrated in FIG. 8, a slot of the PUSC mode signifies a sub-channel comprised of two symbols and of four clusters. Furthermore, each cluster has 12 data sub-carriers.

The FUSC mode provides a permutation scheme whereby full or all sub-channels are used in transmitting data. As illustrated in FIG. 9, a slot of the FUSC mode signifies a sub-channel comprising one symbol and 48 data sub-carriers, as in the PUSC mode. Furthermore, both in the PUSC mode and the FUSC mode, each slot possesses 48 data sub-carriers.

Figure 10:
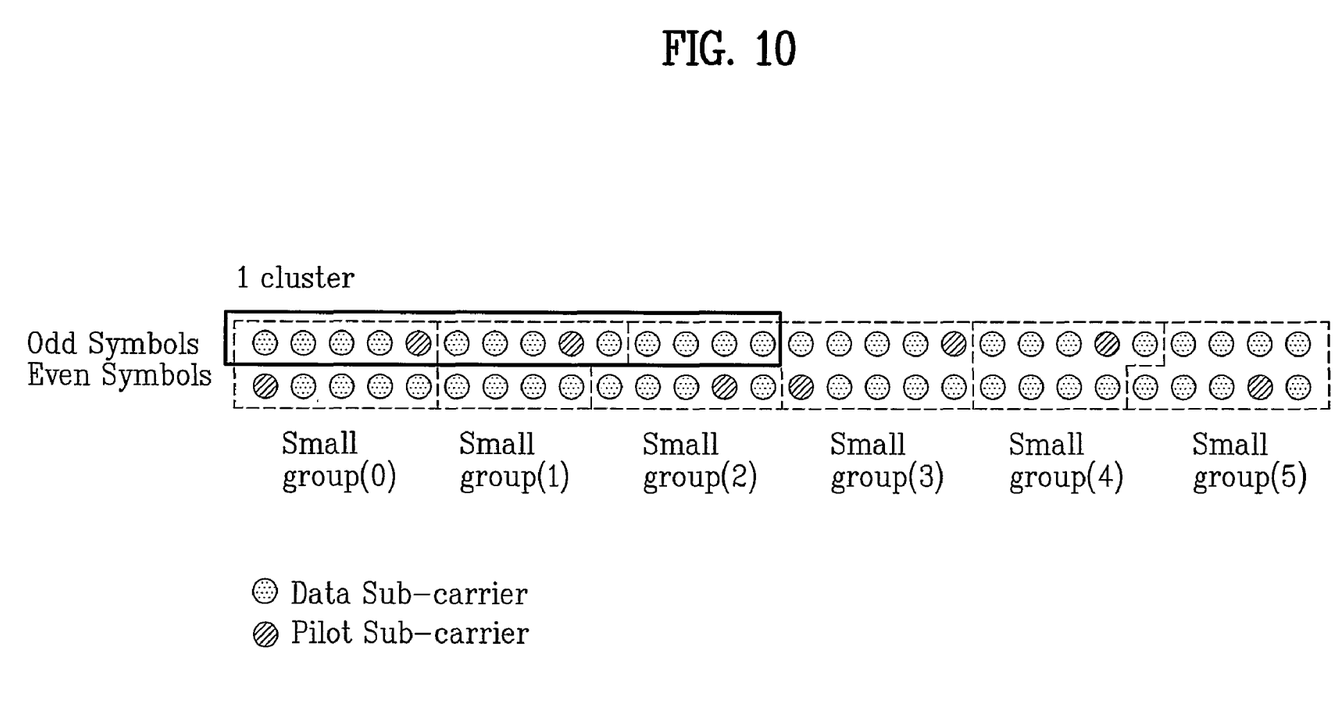
FIG. 10 illustrates an example of a composition of data sub-carriers.
Figure 11:
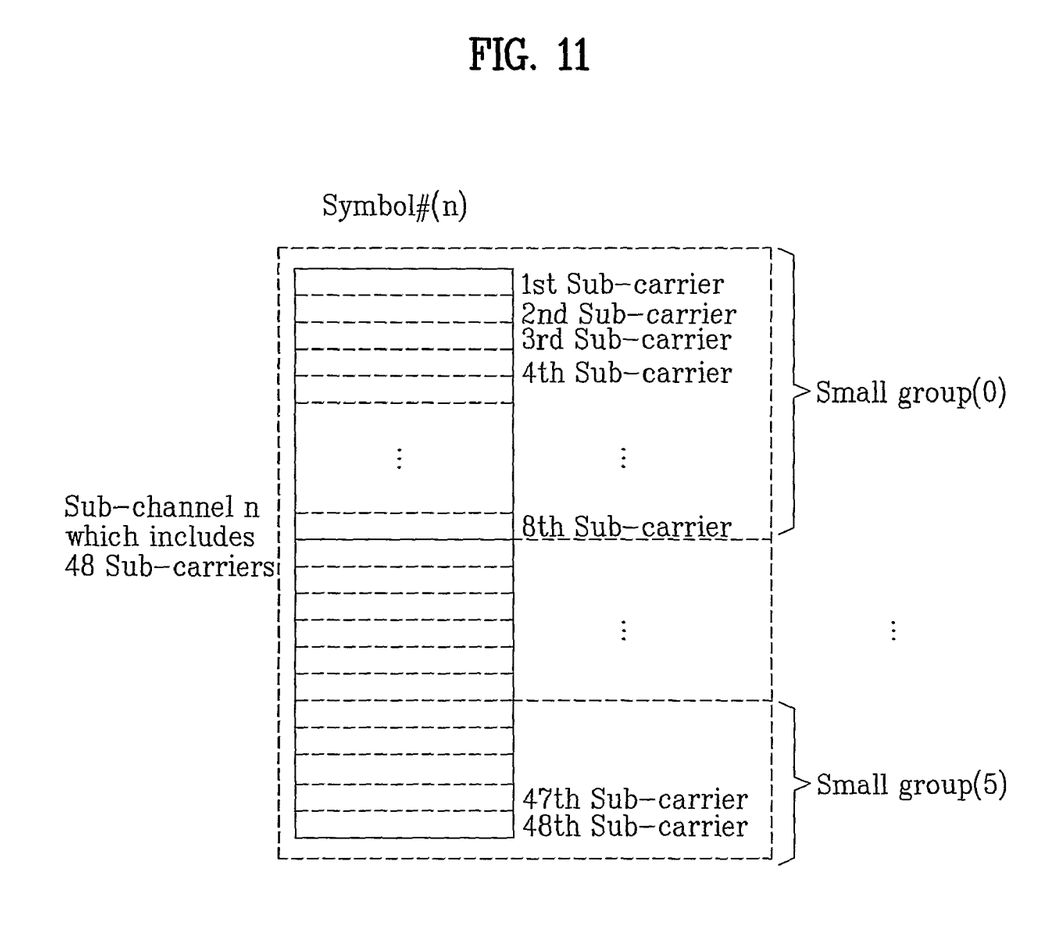
FIG. 11 illustrates an example of a composition of data sub-carriers.

In the present embodiment, as is the case in the fast feedback channel in the downlink direction, one slot is allocated to the fast feedback channel in downlink direction. In other words, the slot indicated in FIGS. 1 and 2 can be expressed as the basic allocation unit of the physical channel space of the fast feedback channel. Because the PUSC mode and the FUSC mode each include 48 data sub-carriers, the same modulation method can be applied despite the differences in shapes of the two modes. FIG. 10 and FIG. 11 are example illustrating a composition of data sub-carriers. In FIGS. 10 and 11, 48 data sub-carriers can be divided into six small groups. Furthermore, each small group includes eight sub-carriers. With this arrangement, the downlink fast feedback channel can apply the composition of the uplink fast feedback channel. Table 3 illustrates a sub-carrier modulation method of a feedback channel according to the embodiment of the present invention.

TABLE 3

| 4 bit payload | Vector indices to be used by fast feedback channel per small group (small group 0, small group 1 . . . small group 5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, 0, 1, 2, 3, 4 |

In Table 3, the order combination(s) of vector indices according to payload and the small groups (0-5) can be changed. Table 4 of below shows data sub-carrier modulation method for each vector of Table 3.

TABLE 4

| Vector Index | Data sub-carrier modulation technique per each vector index (sub-carrier 0, sub-carrier 1 . . . sub-carrier 7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

The fast feedback channel modulation according to the embodiment of the present invention can use various modulation techniques such as Binary Phase Shift Keying (BPSK), Quadrature Phase Shift Keying (QPSK), and 16 Quadrature Amplitude Modulation (16 QAM). Each modulation techniques (P0, P1, P2, P3) of Table 4 shows an example of the QPSK technique applied to the OFDM/OFDMA system. Furthermore, the modulation order combination(s) according to each vector index in Table 4 may vary.

To describe another operation of transmitting/receiving information between the BS and the MSS in a wireless communication system for transmitting information, the structure of FIG. 7 will be used, along with the number labels, to explain the operation. In operation, a controller 20 of the BS allocates a physical resource for a downlink fast feedback channel and establishes a modulation pattern to the downlink fast feedback channel by the BS. Here, the physical resource for the downlink fast feedback channel is different from a physical resource for a data channel, and also, the modulation pattern corresponds to feedback information. Thereafter, the transmitter 22 of the BS transmits the modulation pattern to the MSS.

At the MSS, a receiver 13 receives the modulation pattern transmitted from a base station (BS). Here, the modulation pattern was established to the downlink fast feedback channel at the controller 20 of the BS, and the modulation pattern corresponds to feedback information. Upon receipt, a controller 10 of the MSS detects the modulation pattern transmitted from the BS and determines which feedback information is transmitted from the BS via the modulation pattern. After determining the feedback information, a transmitter 14 of the MSS transmits an uplink data, which has been configured by using the feedback information, to the BS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting information in a wireless communication system, the method comprising:
    allocating a physical resource for a downlink fast feedback channel by a base station (BS), wherein the physical resource for the downlink fast feedback channel is different from a physical resource for a data channel;
    establishing a modulation pattern to the downlink fast feedback channel by the BS, wherein the modulation pattern corresponds to feedback information; and
    transmitting the modulation pattern to a mobile subscriber station (MSS),
    wherein a basic allocation unit of the physical resource for the downlink fast feedback channel is divided into six sub-groups with each of the six sub-groups including eight sub-carriers,
    wherein the modulation pattern includes a plurality of vector indexes, each of the plurality of vector indexes corresponding to one of the six sub-groups, and
    wherein each of the plurality of vector indexes indicates a modulation scheme applied to each of the eight sub-carriers of the corresponding sub-group.

2. The method of claim 1, further comprising receiving uplink data from the MSS, wherein the uplink data is configured by using feedback information.

3. The method of claim 1, wherein a location of the downlink fast feedback channel is notified to the MSS by the BS.

4. The method of claim 1, wherein a size of the downlink fast feedback channel is notified to the MSS by the BS.

5. The method of claim 1, wherein each of the plurality of vector indexes have orthogonal relationships with each other.

6. The method of claim 1, wherein the feedback information includes channel quality information (CQI).

7. The method of claim 1, wherein the feedback information includes weight values.

8. The method of claim 1, wherein the feedback information includes a combination of channel quality information (CQI) and weight values.

9. A method of receiving information in a wireless communication system, the method comprising:
    receiving and detecting a modulation pattern transmitted from a base station (BS), wherein the modulation pattern is established to a downlink fast feedback channel and the modulation pattern corresponds to feedback information;
    determining which feedback information is transmitted from the BS via the modulation pattern; and
    transmitting uplink data, wherein the uplink data is configured by using the feedback information, wherein a basic allocation unit of a physical resource for the downlink fast feedback channel is divided into six sub-groups with each of the six sub-groups including eight sub-carriers, wherein the modulation pattern includes a plurality of vector indexes, each of the plurality of vector indexes corresponding to one of the six sub-groups, and wherein each of the plurality of vector indexes indicates a modulation scheme applied to each of the eight sub-carriers of the corresponding sub-group.

10. The method of claim 9, wherein the feedback information includes channel quality information (CQI).

11. The method of claim 9, wherein the feedback information includes weight values.

12. The method of claim 9, wherein the feedback information includes a combination of channel quality information (COI) and weight values.

13. A method of transmitting and receiving information in a wireless communication system, the method comprising:

allocating a physical resource for a downlink fast feedback channel by a base station (BS), wherein the physical resource for the downlink fast feedback channel is different from a physical resource for a data channel;

establishing a modulation pattern to the downlink fast feedback channel by the BS, wherein the modulation pattern corresponds to feedback information;

transmitting the modulation pattern to a mobile subscriber station (MSS);

receiving and detecting the modulation pattern transmitted from the base station (BS);

determining which feedback information is transmitted from the BS via the modulation pattern; and transmitting uplink data, wherein the uplink data is configured by using the feedback information, wherein a basic allocation unit of the physical resource for the downlink fast feedback channel is divided into six sub-groups with each of the six sub-groups including eight sub-carriers, wherein the modulation pattern includes a plurality of vector indexes, each of the plurality of vector indexes corresponding to one of the six sub-groups, and wherein each of the plurality of vector indexes indicates a modulation scheme applied to each of the eight sub-carriers of the corresponding sub-group.

14. The method of claim 13, wherein a location of the downlink fast feedback channel is notified to the MSS by the BS.

15. The method of claim 13, wherein a size of the downlink fast feedback channel is notified to the MSS by the BS.

16. The method of claim 13, wherein each of the plurality of vector indexes have orthogonal relationships with each other.

17. The method of claim 13, wherein the feedback information includes channel quality information (CQI).

18. The method of claim 13, wherein the feedback information includes weight values.

19. The method of claim 13, wherein the feedback information includes a combination of channel quality information (CQI) and weight values.

20. A base station (BS), comprising:

a controller for allocating a physical resource for a downlink fast feedback channel by the base station (BS) and establishing a modulation pattern to the downlink fast feedback channel by the BS, wherein the physical resource for the downlink fast feedback channel is different from a physical resource for a data channel; and a transmitter for transmitting the modulation pattern to a mobile subscriber station (MSS), wherein the modulation pattern corresponds to feedback information, wherein a basic allocation unit of the physical resource for the downlink fast feedback channel is divided into six sub-groups with each of the six sub-groups including eight sub-carriers, wherein the modulation pattern includes a plurality of vector indexes, each of the plurality of vector indexes corresponding to one of the six sub-groups, and wherein each of the plurality of vector indexes indicates a modulation scheme applied to each of the eight sub-carriers of the corresponding sub-group.

21. A mobile subscriber station (MSS), comprising:

a receiver for receiving a modulation pattern transmitted from a base station (BS), wherein the modulation pattern is established to a downlink fast feedback channel and the modulation pattern corresponds to feedback information;

a controller for detecting the modulation pattern transmitted from the BS and determining which feedback information is transmitted from the BS via the modulation pattern; and a transmitter for transmitting uplink data, wherein the uplink data is configured by using the feedback information, wherein a basic allocation unit of a physical resource for the downlink fast feedback channel is divided into six sub-groups with each of the six sub-groups including eight sub-carriers, wherein the modulation pattern includes a plurality of vector indexes, each of the plurality of vector indexes corresponding to one of the six sub-groups, and wherein each of the plurality of vector indexes indicates a modulation scheme applied to each of the eight sub-carriers of the corresponding sub-group.

* * * * *